United States Patent [19]

Jarke et al.

[11] Patent Number: 5,310,208
[45] Date of Patent: May 10, 1994

[54] COLLAPSIBLE WHEELED SEAT

[75] Inventors: Joseph M. Jarke, Austin, Tex.; Ole I. Thorsen, La Conner, Wash.; Paul J. Horak, Lenox, Mass.; Phillip C. Kiesler, Greenville, Ind.; Michael K. Harvey, Louisville, Ky.; Charles Miller, Floyds Knobs, Ind.

[73] Assignee: Jarke-Thorsen Products, Inc., Austin, Tex.

[21] Appl. No.: 641,426

[22] Filed: Jan. 17, 1991

Related U.S. Application Data

[63] Continuation-in-part of Ser. No. 621,422, Nov. 30, 1990, Pat. No. 5,273,307, which is a continuation of Ser. No. 409,469, Sep. 19, 1989, Pat. No. 4,974,870.

[51] Int. Cl.⁵ ................................................ B62B 7/06
[52] U.S. Cl. ......................................... 280/643; 280/650; 297/17
[58] Field of Search .............. 280/30, 639, 641, 642, 280/643, 650, 37, 647, 648, 33.994, 47.34, 47, 38; 297/16, 17, 19, 30, 42, 44, 51, 54, DIG. 4; 16/35 R; 188/19, 20, 29, 31

[56] References Cited

U.S. PATENT DOCUMENTS

| | | | |
|---|---|---|---|
| D. 297,722 | 9/1988 | Siwersson et al. | D12/131 |
| D. 300,733 | 4/1989 | Wagner | D12/131 |
| 630,427 | 8/1899 | Turner | 190/2 |
| 2,447,557 | 8/1948 | Blaney | 280/37 |
| 2,528,676 | 11/1950 | Walters | 297/17 |
| 2,532,863 | 12/1950 | Taylor | 297/16 |
| 2,589,372 | 3/1952 | Hake | 297/17 |
| 2,729,276 | 1/1956 | Volney | 297/17 |
| 2,966,204 | 12/1960 | Caravias | 297/17 |
| 3,544,157 | 12/1970 | Muller | 297/17 |
| 3,674,306 | 7/1972 | Botney | 297/17 |
| 3,765,718 | 10/1973 | Chen | 297/17 |
| 3,909,061 | 9/1975 | Johnson | 297/17 |
| 3,968,991 | 7/1976 | Maclaren | 297/45 |
| 4,025,088 | 5/1977 | Rothschild | 280/644 |
| 4,045,051 | 8/1977 | Igarashi et al. | 280/641 |
| 4,164,354 | 8/1979 | Rodaway | 280/647 |
| 4,369,987 | 1/1983 | Witherell | 280/644 |
| 4,405,142 | 9/1983 | Whetstine | 297/45 |
| 4,415,177 | 11/1983 | Hale et al. | 280/650 |
| 4,527,829 | 7/1985 | Fanslau et al. | 297/17 |
| 4,545,591 | 10/1985 | Balha | 280/33.994 |
| 4,632,409 | 12/1986 | Hall et al. | 280/643 |
| 4,767,128 | 8/1988 | Terhune | 280/47.34 |
| 4,831,689 | 5/1989 | Lo | 280/47.38 |
| 4,844,209 | 7/1989 | Sedlack | 280/87.051 |
| 4,974,870 | 12/1990 | Jarke et al. | 280/643 |
| 4,976,447 | 12/1990 | Batson | 280/33.994 |

FOREIGN PATENT DOCUMENTS

| | | | |
|---|---|---|---|
| 2302066 | 9/1976 | France . | |
| 729551 | 5/1955 | United Kingdom | 280/37 |
| 2161455 | 1/1986 | United Kingdom . | |

Primary Examiner—Richard M. Camby
Attorney, Agent, or Firm—Richard J. Smith

[57] ABSTRACT

The seat comprises a front end and a back end interconnected by foldable sides and a top which can be swung into a vertical position and inserted into the back end when the seat is collapsed. The ends are shallow, rectangular boxes with their smaller surfaces oriented top and bottom when the seat is erected. The seat further comprises two handles detachably attached to the back end and stored inside the front end when the seat is collapsed. The sides are hinged such that their centers fold inward when the seat is collapsed, allowing the ends of the seat to move together and be latched together. There are four casters, one at each corner of the bottom of the erected seat and a foot rest which swings or pivots out of the front of the seat. The casters are lockable to prevent the seat from rolling when desired. A carrying handle is attached to the front end of the top of the seat and is accessible for carrying the seat when the seat is collapsed with the top inserted and locked into the back end. Erected, the seat is sized to fit in the aisles of commercial aircraft. Collapsed, its size and shape conform to airline regulations for carry-on luggage.

20 Claims, 9 Drawing Sheets

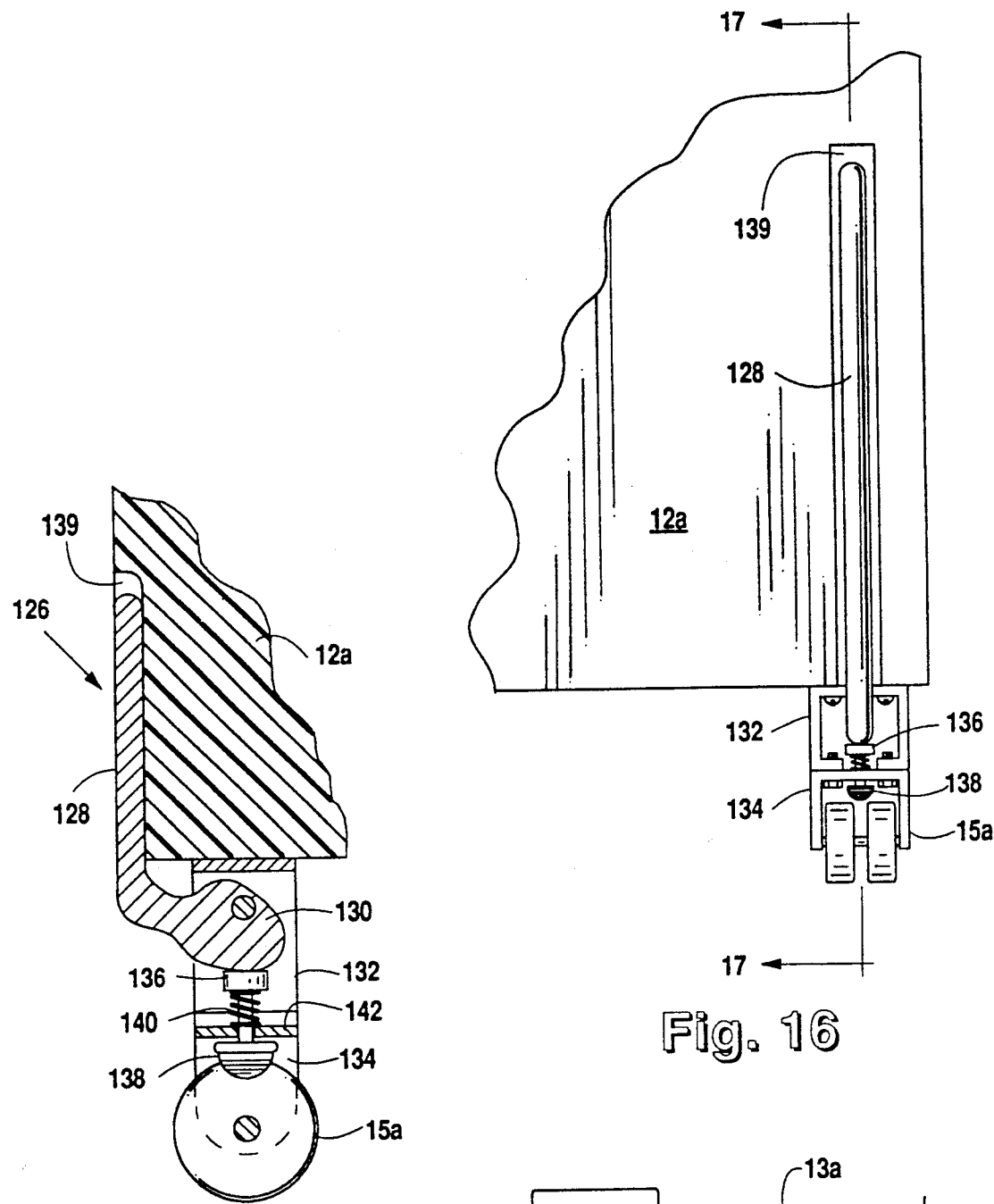
Fig. 16
Fig. 17
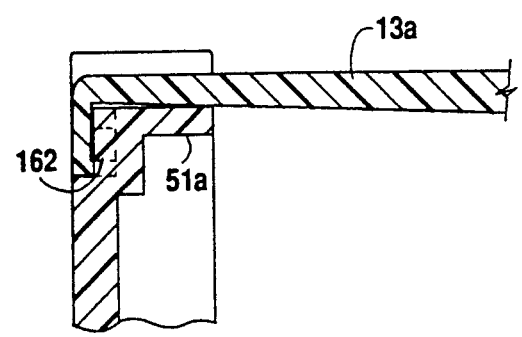
Fig. 18

5,310,208

COLLAPSIBLE WHEELED SEAT

This is a continuation-in-part of copending application Ser. No. 07/621,422 filed on Nov. 30, 1990 now U.S. Pat. No. 5,273,307, entitled LIGHTWEIGHT, COMPACT, ERECTABLE/COLLAPSIBLE WHEELED SEAT, which is a continuation of U.S. patent application Ser. No. 07/409,469 filed Sep. 19, 1989, entitled LIGHTWEIGHT, COMPACT, ERECTABLE/COLLAPSIBLE WHEELED SEAT, now U.S. Pat. No. 4,974,870.

BACKGROUND OF THE INVENTION

The present invention relates to wheeled vehicles, particularly wheeled seats and chairs and, more particularly, wheeled seats which can be collapsed into compact form carriable by one hand. A closely related field is that of foldable or collapsible seats and chairs.

Conventional wheelchairs are typically bulky and not designed for carrying by hand or for usage in the aisles and lavatories of commercial aircraft. Conventional wheelchairs may therefore create an impediment to air travel and other activities by persons who do not have full use of their legs.

SUMMARY OF THE INVENTION

The present invention provides a collapsible wheeled seat which is intended for use by persons who do not have full use of their legs. The present invention is usable for moving freely through narrow entrances and passageways and for maneuvering about in small areas. Further, the present invention is reliable, i.e. structurally sound and not inadvertently collapsible, light enough to be easily carried by one hand, sized and shaped when collapsed to conform to airline carry-on luggage regulations, and sized and shaped when ready for use to fit freely but closely in airplane aisles and restrooms.

The fully erected seat is box-like in shape, having a top, two sides, two ends and an open bottom. Two handles with a fabric back rest stretched between them are attached to one end of the seat. Each handle comprises an upright portion detachably attached at its lower end to the end of the seat and formed at its upper end to provide a handle which is essentially horizontal and extends away from the seat. The back rest is attached at its ends to the vertical portions. The end of the seat to which the handles are attached is termed the back end of the seat. In one embodiment, the handles may be received within cylindrical metal tubes in the back end of the seat.

A portion of the front end of the seat is hinged horizontally across the front surface near its lower edge and folds outward and downward to form a foot rest. It is held closed by a latch when not in use and held at the proper angle when open by two straps, one at each end of the foot rest. In one embodiment, the foot rest may comprise a generally U-shaped tube pivotally connected to the front end of the seat. Each end is a shallow box and the open faces of the boxes face each other and are interconnected by hinged panels as described below. When the seat is collapsed the handles are detached and stored inside the front end, held in place by retaining straps or clips.

In one embodiment, the top of the seat is a panel having pins extending laterally from its back end into vertical grooves in and extending a short distance above the inner surfaces of the side portions of the back end. There is a slot in the top of the back end, extending laterally from groove to groove. When the seat is being collapsed the top is swung upward about the pins until it is parallel to the broad surface of the end and then it is lowered through the slot, into the end, with the pins moving in the grooves. There are also pins extending laterally from the front end of the top panel and these pins are manually retractable and spring loaded to extend. When the top is being inserted into the end, the retractable pins are held retracted until the seat is fully inserted and then released. Upon release they engage the slots and retain the top inserted in the end. When the seat is fully erected these pins engage holes in the front end of the seat to hold the top in place so that the seat can be maneuvered by the carrying grip attached to the front end of the top.

The grip is similar to an attache case handle. It extends above the top of the back end when the seat top is fully inserted into the end and is used for carrying the collapsed seat. Alternatively, a pivotal, generally U-shaped locking brace may provide a handle grip.

Each of the sides of the seat comprise two rectangular panels having vertical and horizontal edges. The two panels are hinged together at their adjoining vertical edges. The other vertical edge of one panel is hinged to the front end of the seat and the other vertical edge of the other panel is hinged to the back end of the seat. The hinges are arranged such that the joined vertical edges of each pair of panels can move toward each other, i.e. toward the center vertical plane of the seat as the panels are folded against each other on each side. As they fold, the ends are drawn together and, when the folding is complete, the ends are in close proximity to each other and latched together to complete the collapsing of the seat, the foot rest being in its closed position, the handles and back rest stored in the front end and the top inserted into the back end.

There are three accessories for the seat: a carrying case, a snap-on cushion and a seat belt. The cushion is stored in the carrying case along with the seat when the seat is collapsed. The carrying case is equipped with two loops that allow carrying the case on the handles of a conventional wheel chair.

To erect the seat, the ends are unlatched from each other and moved apart until the panels on each side are fully open, coplanar and held so by latches. A generally U-shaped pivotal locking brace mounted to the front end may be pivoted downward to engage a clip on the back end to lock the ends and sides in place. The handles, seat belt, cushion and back rest are then removed from inside the front end. The handles are attached to the back end. The top is then extracted from the back end and the cushion is snapped into place. The top is then swung into its in-use position and the seat belt, if not already attached to the handles, is attached. The foot rest is then extended and the seat is ready for use.

Locking apparatus is provided for preventing the casters or wheels from rolling. The locking apparatus comprises a combination lever and cam which operatively engages a plunger apparatus which is adapted to impinge against the rear casters of the seat so as to prohibit undesired rolling of the casters.

In summary, the collapsible wheeled seat of the present invention comprises a front and back ends connected by a pair of foldable sides, a top, a back support adapted to be connected to the back end, a plurality of wheels connected to the front and back ends, apparatus for locking the rear wheels so as to prohibit undesired rolling thereof, and a pivotal brace apparatus for bracing the front and back ends and folding sides while the seat is in an open position.

BRIEF DESCRIPTION OF THE DRAWINGS

FIG. 16 is a sectional elevational view of a rear caster and brake assembly.

FIG. 17 is a cross sectional view taken along section lines 17—17 of FIG. 16 illustrating the braking apparatus of the present invention.

FIG. 18 is a partial cross sectional view of the top of the seat of an alternate embodiment of the present invention engaged with the front end of the seat.

DETAILED DESCRIPTION OF THE PREFERRED EMBODIMENT

Figure 1:
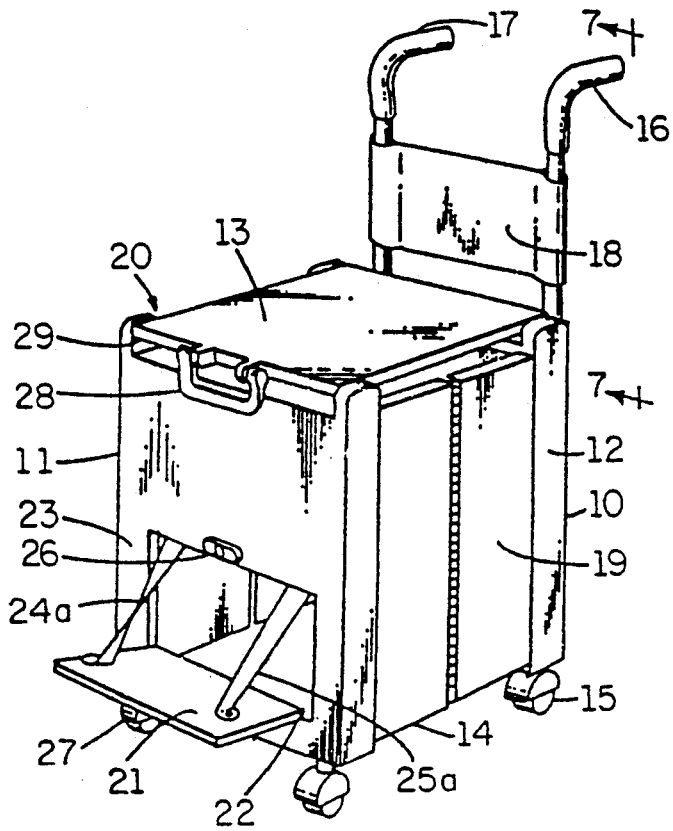
FIG. 1 is a perspective view of the seat ready for use.

FIG. 1 is a perspective view of the seat 10 erected and ready for use. It comprises a front end 11, a back end 12, a top 13, an open bottom 14, four casters or wheels, one at each corner of the bottom, caster 15 being typical, handles 16 and 17 attached to the back end with back rest 18 stretched between them and first and second sides, side 19 being typical and side 20 not visible in this view. Foot rest 21 is a panel hinged at 22 to pivot or swing outward and downward from surface 23 of the front end into its erected condition. Straps 24a and 25a limit its travel to its erected condition and latch elements 26 and 27 cooperate to hold it in its stored position when desired. Grip 28 pivoted to end 29 of top 13 serves as the carrying handle for the chair in its collapsed mode, as explained below.

Figure 2:
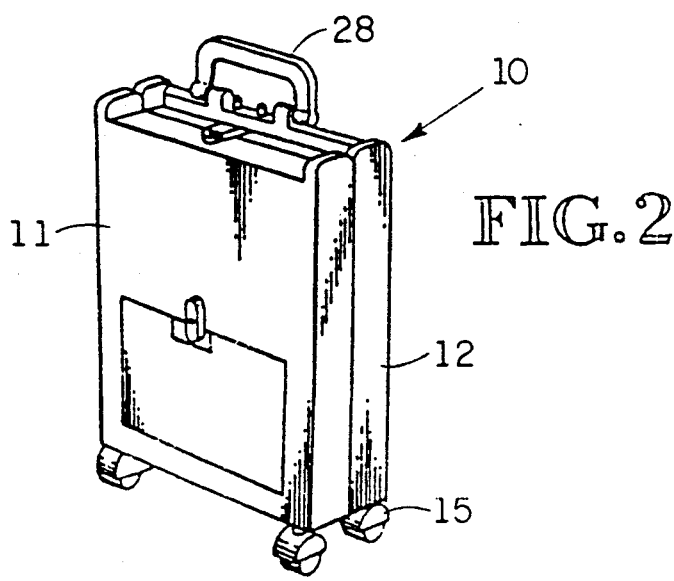
FIG. 2 is a perspective view of the seat collapsed.
Figure 3:
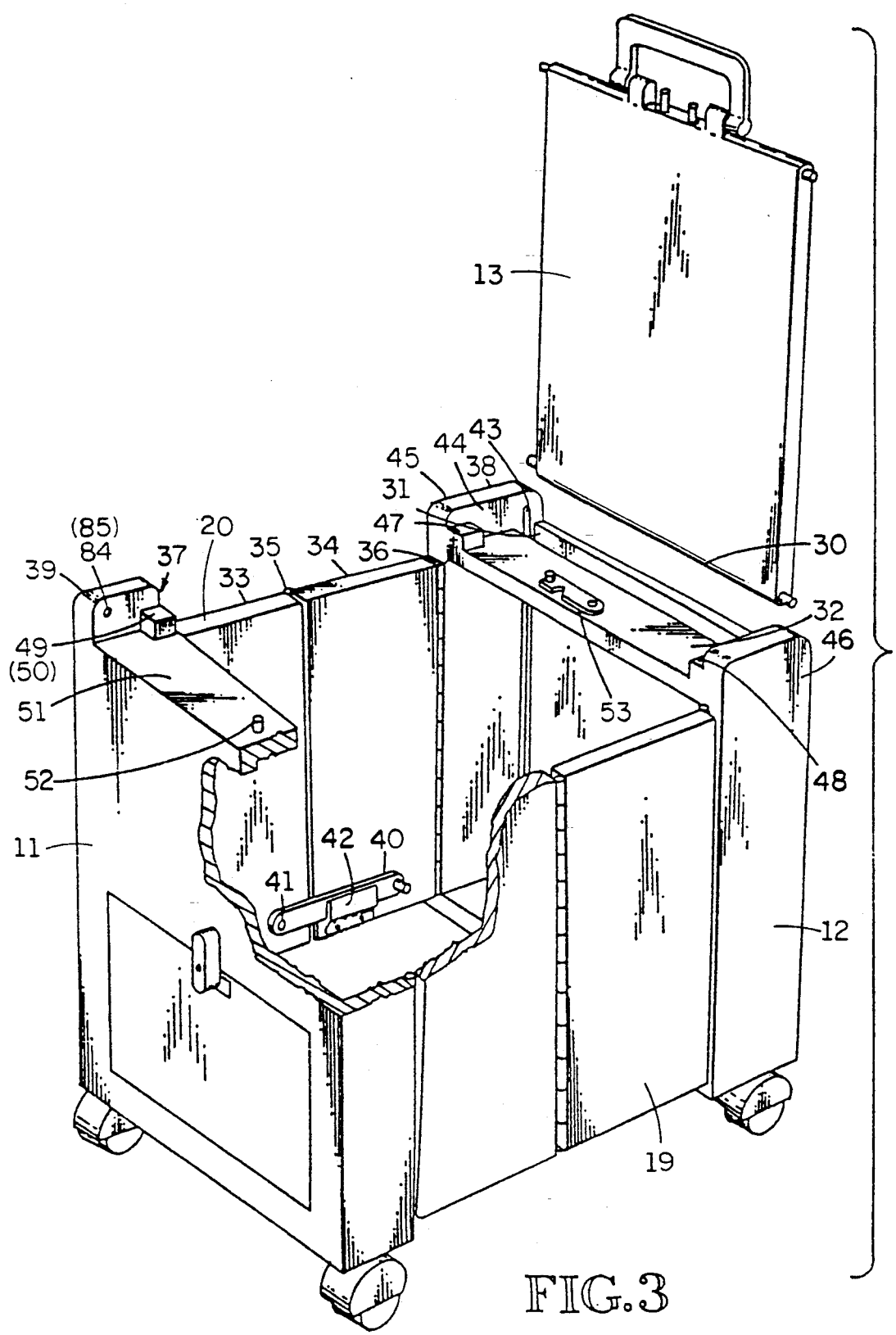
FIG. 3 is a perspective sectional view of the seat showing interior details.

Referring to FIG. 1 and FIG. 3, ends 11 and 12 are shallow boxes, each having a closed face, an open face, two sides and a top and a bottom. The handles 16, 17 and backrest 18 are detachable and are stored inside front end 11 when the seat 10 is collapsed. FIG. 2 illustrates the seat 10 in its collapsed condition and ready to be carried.

In FIG. 3, a sectional view showing interior details of the seat, the handles 16, 17 and back rest 18 have been removed and top 13 has been pivoted so that its broad surfaces are parallel to the broad surface of the back end 12. The top 13 pivots about pins which extend laterally from its back end 30 and engage grooves in the inner surfaces of the sides of the back end. The pins, grooves and related details are described below with reference to FIG. 5. As explained in more detail below, the top slides into the back end 12 through slot 31 in top 32 of the back end into its collapsed condition as part of the collapsing procedure.

As shown in FIG. 3, in the erected condition of the seat 10 the open faces of the ends 11 and 12 face each other and the ends 11, 12 are interconnected by the sides 19 and 20. Each side of the seat 10 comprises two panels, panels 33 and 34 being typical. In each side the panels are connected by a hinge 35 where they adjoin and hinged at their other long edges 36 and 37 (not visible in this view) to the sides 38 and 39 respectively of the front and back ends. The panels of each side are unfolded, co-planar and held so by latch bar 40 pivotally connected to panel 33 at point 41 and engaging bracket 42 attached to panel 34. When the latch 40 is pivoted out of engagement with bracket 42, the panels are free to pivot with respect to each other and the front and back ends on the hinges. The hinges are arranged such that the adjoining edges of the panels move inward, as shown in FIG. 4, ultimately allowing the two ends 11 and 12 to move into contact with each other, as shown in FIG. 2.

In FIG. 3, groove 43 is visible and is one of the grooves in the inner surfaces of the sides of the back end 12, surface 44 being typical. The groove(s) extend above the top 32 of the back end in extension(s) 45 and 46. Protrusions 47 and 48 support the top when it is in its in-use position. Protrusions 49 and 50 (not shown in this view) on top 51 of the front end 11 support the top 13 at the front end. The protrusions provide clearance for latch elements 52 and 53 which latch the front and back ends together when the seat is collapsed.

Figure 4:
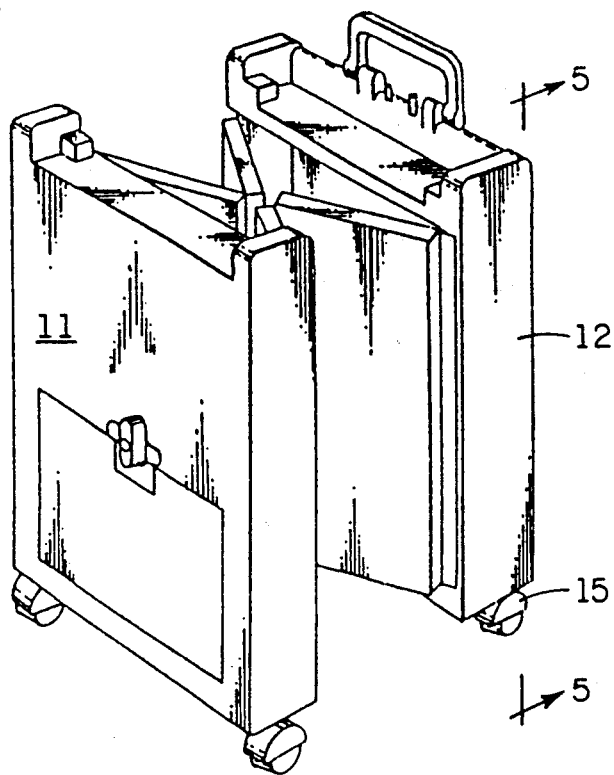
FIG. 4 is a perspective view showing the seat partially collapsed.
Figure 5:
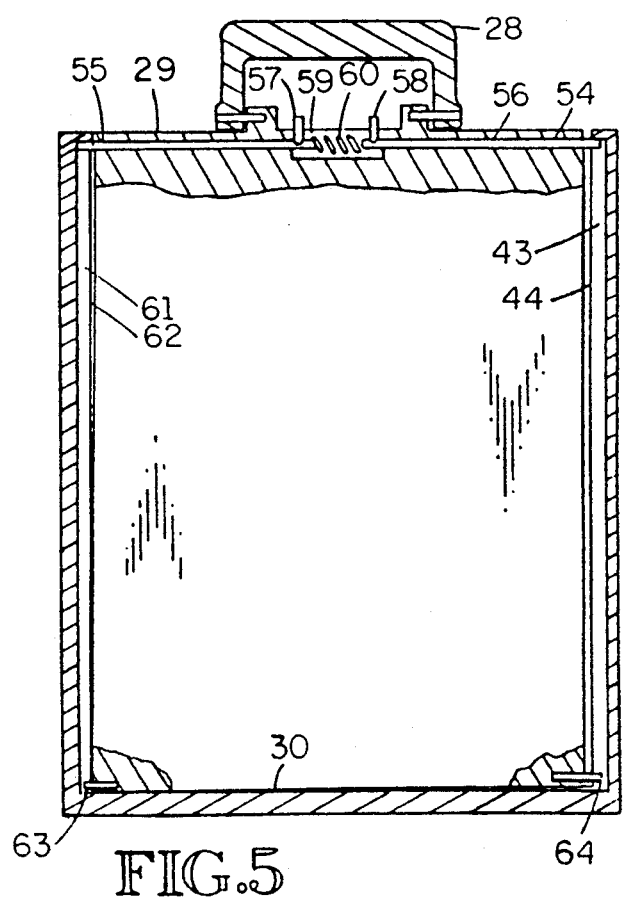
FIG. 5 is a section of the seat, taken at 5—5 in FIG. 4, showing details of the installation of the seat top.

FIG. 5 is a section of the seat taken at 5—5 in FIG. 4, showing details of the installation of the seat top 13. Pins 54 and 55 slide axially in hole 56 which extends across end 24. Stubs 57 and 58 extend from pins 51 and 52, respectively, through slot 59 in end 29. Spring 60 urges the pins 54, 55 to extend into the grooves 44 and 61 in the inner surfaces 45 and 62 of the sides of the back end. When the top 13, with pins 54 and 55 retracted, held by stubs 57 and 58, is fully inserted into slot 32, the pins are allowed to extend into the grooves to lock the top 13 in its fully inserted position so that the seat can be carried by grip 28. Pins 63 and 64 extend laterally from end 30 of the top 13 into grooves 44 and 61 to guide end 30 as the top 13 is inserted into and extracted from the back end 12.

Figure 6:
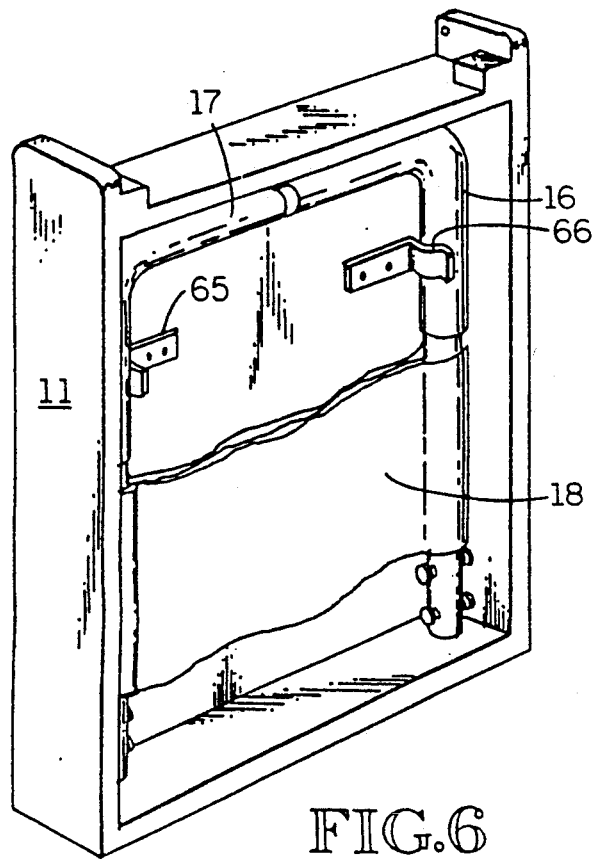
FIG. 6 is a perspective schematic view of the inside of the front end, showing the storage of the handles in the front end.

FIG. 6 is a perspective, schematic view showing the handles 17 and 16 stored inside of front end 11 and held in place by clips 65 and 66. Seat back 18 extends between the handles 16 and 17.

Figure 7:
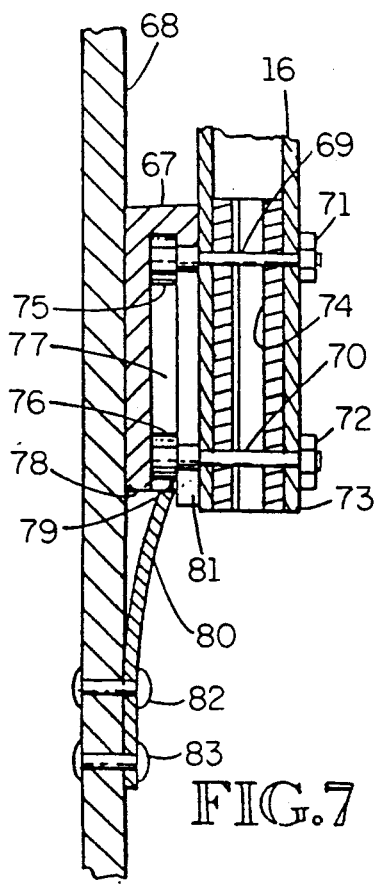
FIG. 7 is a sectional view, taken at 7—7 in FIG. 1, showing details of attachment of the handles.

FIG. 7 is a sectional view taken at 7—7 in FIG. 1 showing details of the attachment of the handles 16 and 17, those for handle 16 being typical. Attachment fixture 67 is attached to the back portion 68 of the back end 12 by fasteners not visible in this view. Specially headed bolts 69 and 70 are fastened by nuts 71 and 72 respectively into end 73 of handle 16. Tube 74 reinforces end 73 and is held in place by the bolts. To install the handle, the handle is maneuvered so that the heads 75 and 76 are moved into T sectioned slot 77 from the bottom end 78 of the attachment fixture, the heads displacing end 79 of leaf spring 80 toward the fixture as the heads are inserted. When both heads are fully into the slot 77, end 79 springs out against shoulder 81 and retains the handle in place. To detach the handle, end 79 is pressed out of the way of the heads and the handle is moved downward and out of the slot. Spring 80 is wider than the diameter of the handle end 73 to facilitate access to the spring 80. The spring 80 is held in place by rivets 82 and 83.

When the top 13 is in its erected condition, extending from the back end to the front end as shown in FIG. 1, pins 54 and 55 engage holes 84 and 85 (FIG. 3, hole 85 not being shown).

Referring to FIGS. 8-18, an alternate embodiment of the present invention will be described in greater detail, with like numerals being utilized to identify elements heretofore discussed. An erectable, collapsible seat 10a comprises a front end 11a, a rear end 12a, a top 13a, and sides 19a and 20a. Ends 11a and 12a have a closed face, an open face, two sides and a top and a bottom similar to ends 11 and 12. Sides 19a and 20a are hingedly connected to front end 11a and back end 12a in a manner similar to that described in connection with sides 19 and 20.

Figure 9:
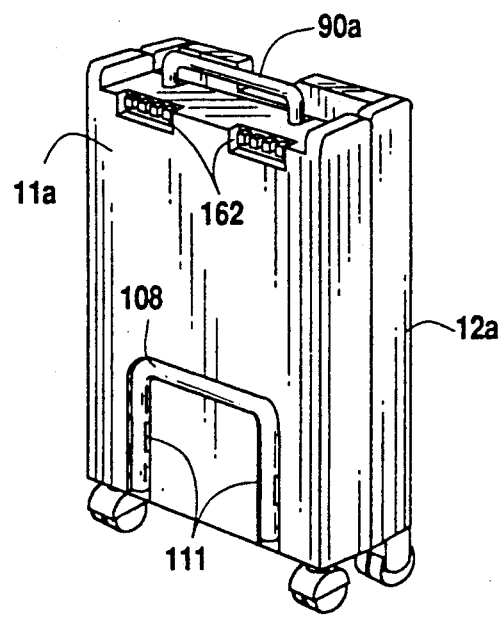
FIG. 9 is a perspective view of an alternate embodiment of the seat collapsed.
Figure 10:
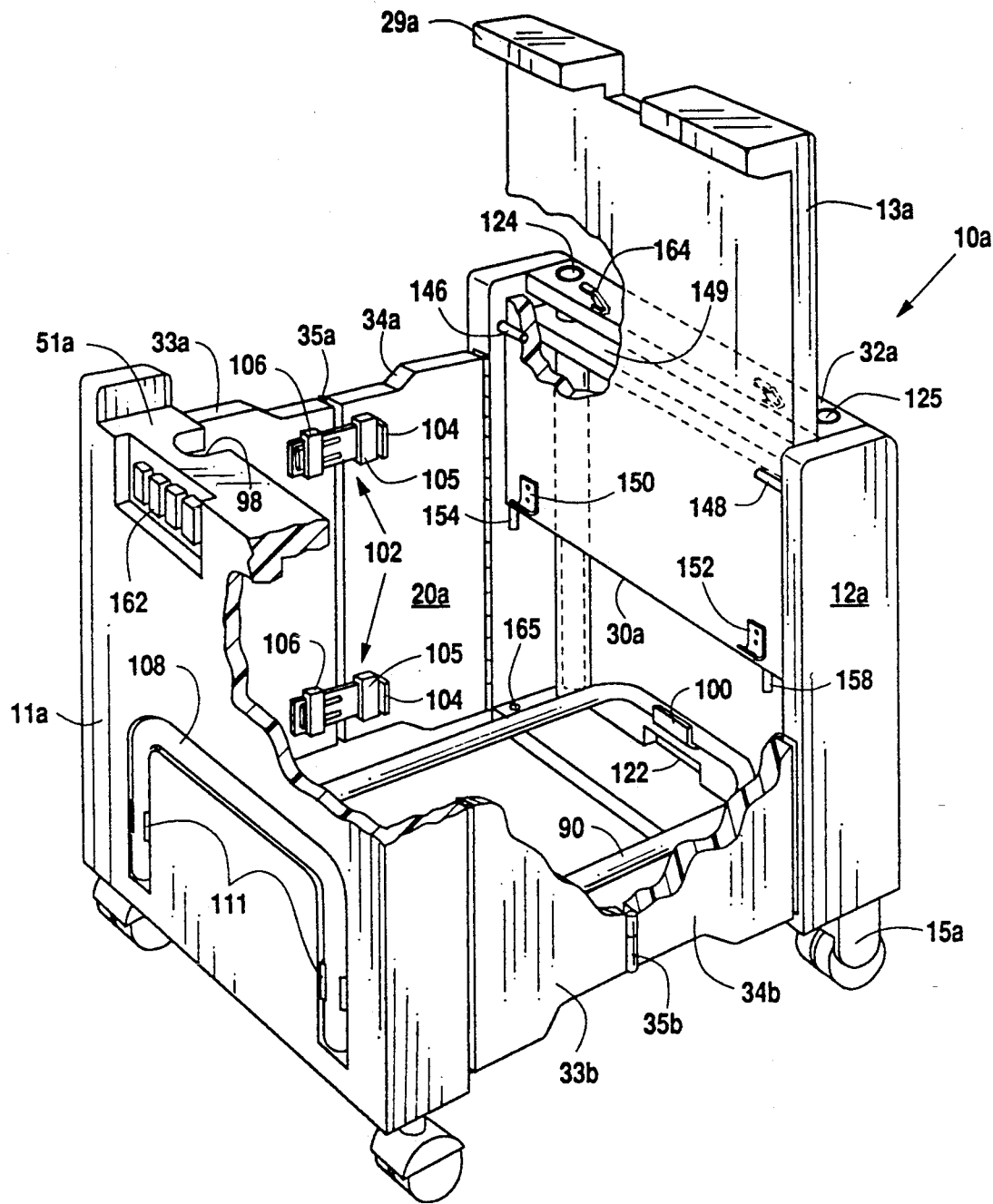
FIG. 10 is a perspective sectional view of an alternate embodiment of the seat showing interior details.
Figure 14:
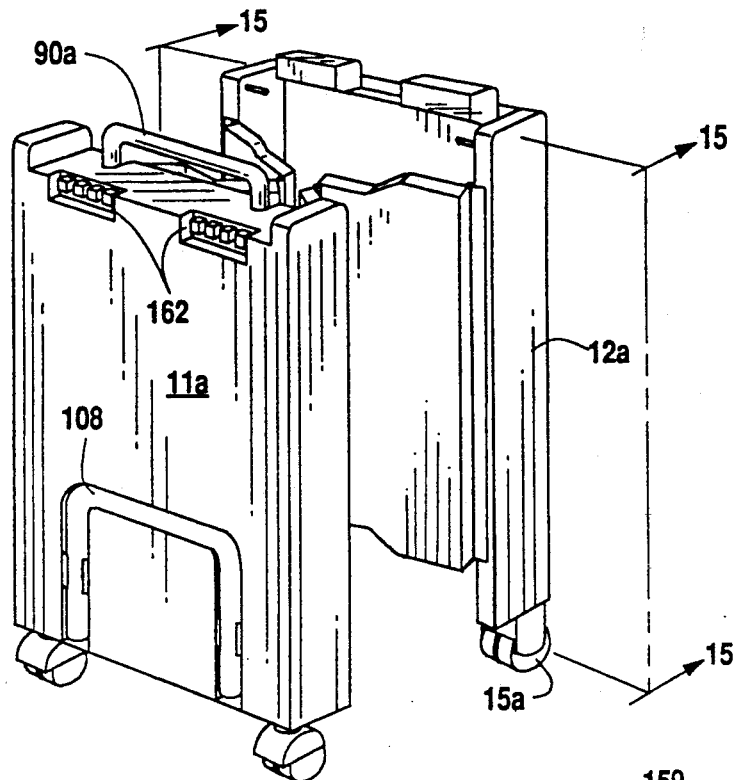
FIG. 14 is a perspective view showing the alternate embodiment of the seat partially collapsed.

As illustrated in FIG. 10, side 19a of the seat 10a comprises panels 33a and 34a which are connected by a hinge 35a. Side 20a of the seat 10a comprises panels 33b and 34b which are connected by a hinge 35b. The hinges are arranged such that the adjoining edges of the panels move inward, as shown in FIG. 14, thereby allowing the ends 11a and 12a to move into contact with each other, as shown in FIG. 9. A plurality of casters or wheels 15a are connected to ends 11a and 12a, preferably two casters 15a connected to the bottom of each end.

Figure 11:
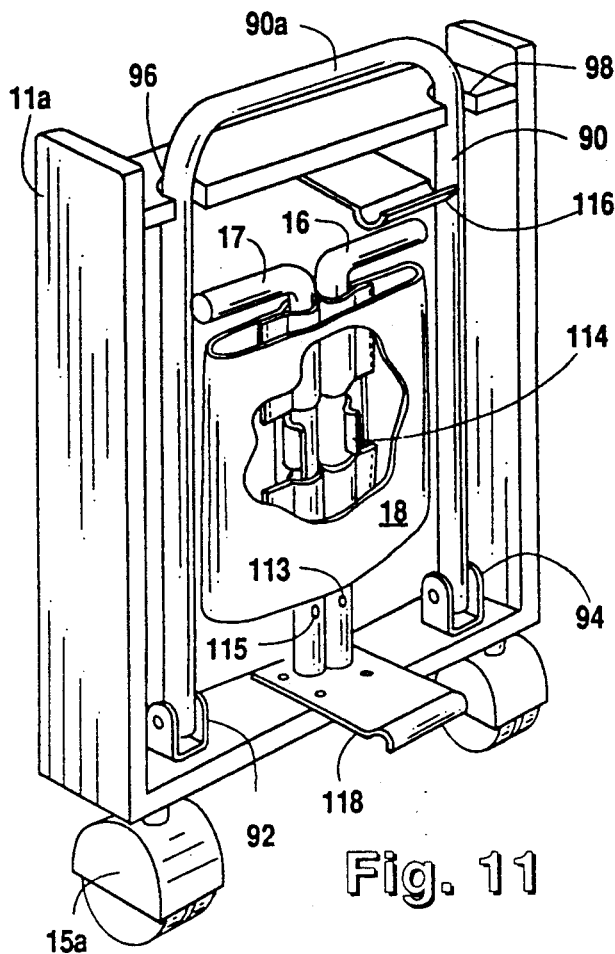
FIG. 11 is a perspective view of the front end of an alternate embodiment of the seat.
Figure 12:
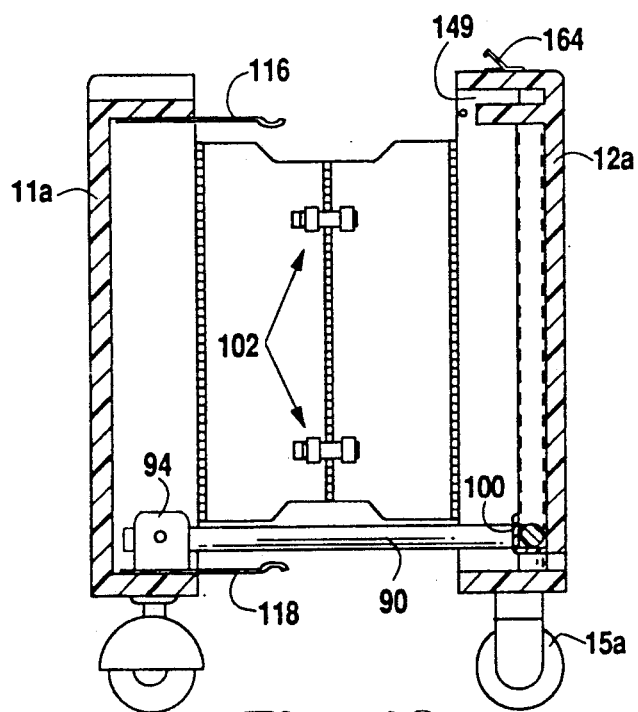
FIG. 12 is a cross sectional side view of an alternate embodiment of the seat.

Referring to FIGS. 10, 11, and 12, the seat 10a comprises a generally U-shaped brace 90 which is pivotally connected to brackets 92 and 94 which are appropriately connected to the bottom panel of front end 11a. When the seat 10a is in its collapsed position, bracket 90 is pivoted upward so that the upper ends thereof are received within grooves 96 and 98 in top 51a of front end 11a. The uppermost end or section 90a of brace 90 functions as a carrying handle for seat 10a when seat 10a is collapsed. When the seat 10a is in its open, erected position, brace 90 is pivoted downward toward back end 12a until section 90a of brace 90 is received within a clip 100 in a press fit. Clip 100 is connected to back end 12a. Brace 90 is utilized to lock the ends and sides of the seat 10a in place during usage thereof. The brace 90 may be returned to its stored position by removing section 90a from clip 100 and pivoting brace 90 upward until its upper ends are received within grooves 96 and 98.

Figure 13:
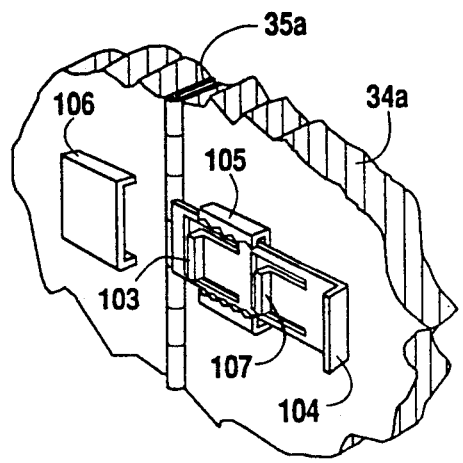
FIG. 13 is a perspective sectional view of a latch for the alternate embodiment of the seat.

Referring to FIGS. 10, 12 and 13, sides 19a and 20a are each provided with a pair of latches 102 for maintaining their respective panels in an open, unfolded and extended position during usage of the seat 10a. Each latch 102 associated with side 19a comprises a plastic arm or clip 104, which is slidably received within a mounting bracket 105 connected to panel 34a, and a receiving channel 106 which is connected to the opposite panel 33a. Each arm 104 has a forward protrusion or ridge 103 and a rearward protrusion or ridge 107. Similar latches 102 are connected to panels 33b and 34b.

During engagement of the latches 102, the forward ridge 103 on arm 104 is pressed through the passage in channel 106 to the opposite side of channel 106, as illustrated in FIGS. 10 and 12. When it is desired to close or collapse the seat 10a, the respective arms 104 are removed from the receiving channels 106 on their adjoining panels, as illustrated in FIG. 13.

Figure 8:
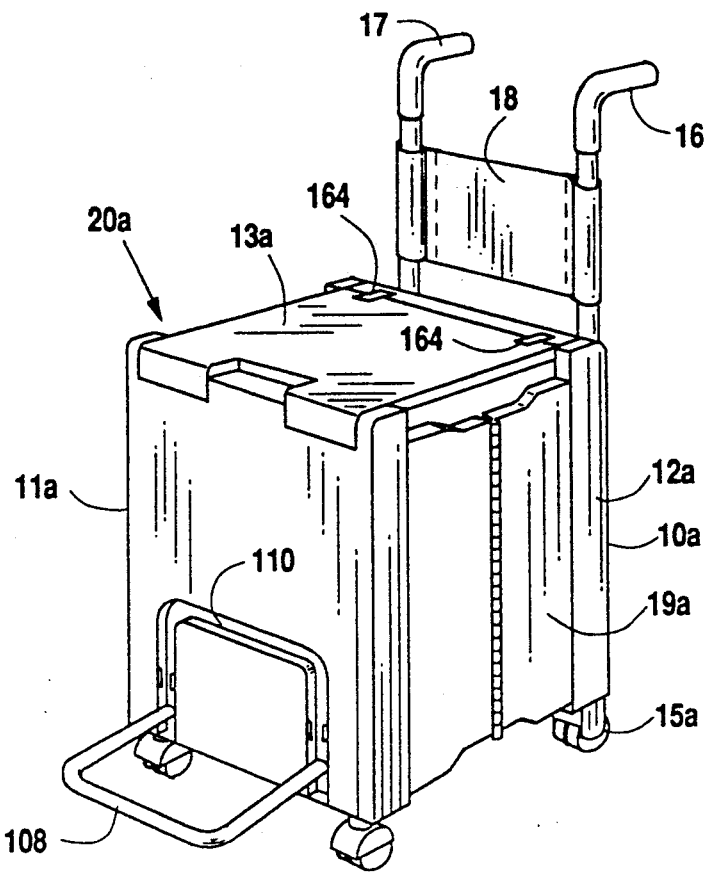
FIG. 8 is a perspective view of an alternate embodiment of the seat ready for use.

Referring to FIGS. 8 and 9, a generally U-shaped tubular foot rest 108 is pivotally connected to front end 11a. Further, when the foot rest 108 is withdrawn or retracted, as illustrated in FIG. 9, it is received within a groove 110 within front end 11a and secured thereto by clips 111 in a press fit.

Figure 15:
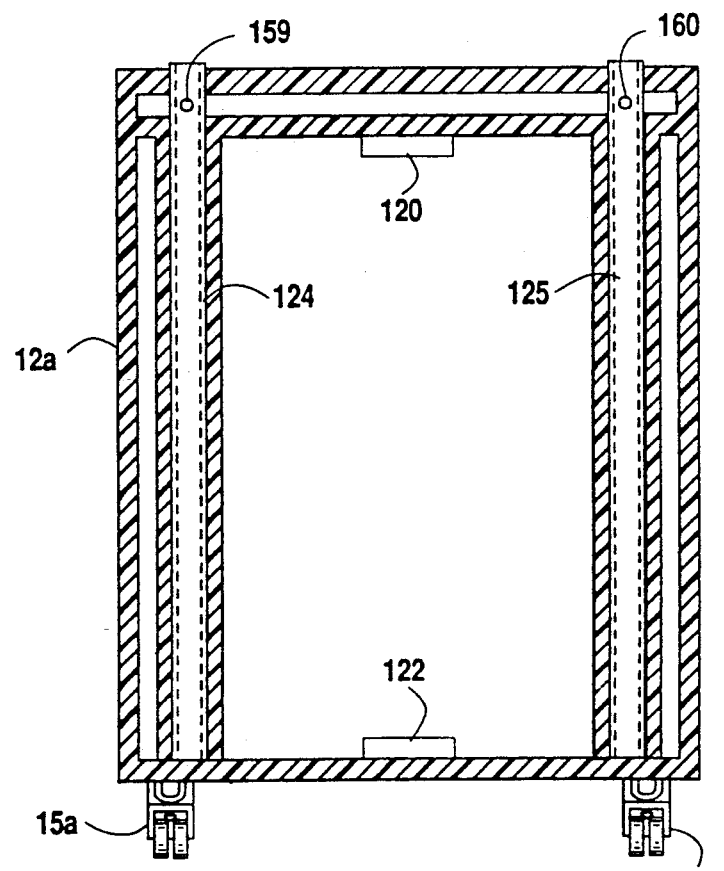
FIG. 15 is a cross sectional view of the seat taken along section lines 15—15 of FIG. 14.

Referring to FIG. 11, the handles 16 and 17 are stored within front end 11a and received within a clip 114 in a press fit. Handles 16 and 17 have passages 113 and 115, respectively, therethrough. The seat 10a further comprises a pair of locking brackets 116 and 118 which are connected to the top and bottom, respectively, of front end 11a. The locking brackets 116 and 118 are adapted to be received within mating slots 120 and 122, respectively, in back end 12a. As illustrated in FIG. 15, back end 12a has a pair of cylindrical tubes 124 and 125 therein for receiving the lowermost ends of handles 17 and 16 when the seat 10a is erected.

Referring to FIGS. 16 and 17, the caster locking mechanism associated with each rear caster 15a will be described in greater detail. Each caster locking mechanism comprises a combination lever and cam apparatus 126 having a lever portion 128 and a cam portion 130. Cam portion 130 is pivotally mounted within a cam housing 132 which is connected to back end 12a. A caster or wheel bracket 134 is connected to housing 132. A headed bolt 136 extends through a passage in the bottom 142 of housing 132 and is connected to a plunger 138. A spring 140 is positioned between the head of bolt 136 and the bottom 142 of housing 132 so as to bias plunger 138 upward toward housing 132. When lever 128 is pulled downwards, cam 130 urges plunger 138 against wheel 15a so as to lock the wheel 15a and prohibit the rolling thereof. Each lever 128 is adapted to be received within a groove in back end 12a, groove 139 being typical, when the braking mechanism is not engaged with the casters 15a.

Referring to FIGS. 8, 9, 10 and 18, the top 13a in its stored position is received between top 32a of end 12a and a pair of opposed pins 146 and 148, which are connected to opposing sides of back end 12a. Top 32a comprises an upper and lower shelf having a slot 149 therebetween. A pair of clips 150 and 152 are connected to the rearward end 30a of top 13a and are adapted to engage pins 146 and 148, respectively, as top 13a is raised. Once the top 13a has been raised, the forward end of seat 13a is pivoted downward toward front end 11a. The top 13a is thereafter pressed rearward so that the rearward edge 30a of seat 13a is received within slot 149. Further, pins 154 and 158 connected to the edge 30a of top 13a are received within the passages 159 and 160 within tubes 124 and 125, respectively, and passages 115 and 113 within handles 17 and 16, respectively. Further, the teeth or ribs 162 on front end 11a engage mating teeth or ribs (not shown) on the underside of forward end 29a of top 13a. Latches 164, such as suitcase type latches, connected to the rearward end 30a of top 13a and the upper shelf of top 32a may be used to further secure the top 13a to the back end 12a. When the top 13a is in its stored position, pins 154 and 158 are received within passages in the bottom of back end 12a, passage 165 being typical.

To erect the seat 10a, the ends 11a and 12a are unlatched from each other and moved apart until the panels on each side are fully opened and coplanar. The latches 102 are thereafter engaged and pivotal brace member 90 is pivoted downward so as to be received within clip 100. The handles 17, 16 are then removed from inside the front end 11a and the lowermost ends thereof are inserted into cylindrical tubes 124 and 125. The top 13a is thereafter pulled upward until clips 150 and 152 engage pins 146 and 148, respectively. The top 13a is thereafter pivoted downward and urged rearward so that the grooves or ribs 30a on the forward end of top 13a matingly engage the ribs 162 on front end 11a. The rearward end 30a of top 13a is pressed back into slot 149 so that pins 154 and 158 are received within passages 159 and 160 and 115 and 113, passage 159 being substantially aligned with passage 115 and passage 160 being substantially aligned with passage 113. The foot rest 108 may thereafter be pivoted outward. Latches 164 may also be engaged.

The seat 10a is collapsed so as to be in a shape and configuration which may be carried in a manner such as a briefcase is carried by pivoting foot rest 108 into groove 110, disengaging latches 164 and ribs 162, pivoting top 13a upward and allowing top 13a to move downward between pins 146, 148 and top 32a. Pins 154 and 156 will also be received within the respective passages in the bottom of rear end 12a. The latches 102 may thereafter be disengaged and brace 90 pivoted upward so as to be received within grooves 96 and 98. The handles 16 and 17 may be returned to their stored position within clip 114 and the ends 11a and 12a folded together and engaged by clips 116 and 118 in grooves 120 and 122, respectively.

Three accessories for the seat may be provided: a carrying case, a seat cushion and a seat belt. The cushion is detachably attached to the top of the seat and is detached, folded and stored in the carrying case when the seat is collapsed. The seat belt comprises two sections. One section is attached at one of its ends to one of the handles; the other is attached at one of its ends to the other handle. The other ends of the sections are attachable, detachable by a buckle apparatus which allows adjustment of the effective length of the belt when it is in use. Rotatable arm rests (not shown) may also be connected to handles 16, 17. The seat 10, 10a has a width from side to side of approximately fifteen inches (15") and a height (not including handles 16, 17) of approximately twenty two inches (22"). The hinges on sides 19a and 20a may be plastic.

It is considered to be understandable from the preceding descriptions that the subject invention meets its objectives. It provides a collapsible wheeled seat which provides optimum compromise among its utility, reliability, cost, weight, its size and shape when it is erected and ready to use and its size and shape when it is collapsed. Its simple structure enhances its reliability and structural soundness, enabling it to be light enough to be easily carried by one hand. When erected it is sized and shaped to be stable and fit in the aisles of commercial aircraft. When collapsed it conforms to the commercial airline regulations for carry-on luggage. The simplicity also enables its cost to be what is considered to be reasonable.

The subject seat 10 and 10a is for use by persons not having full use of their legs. It is erectable/collapsible and enables free movement through narrow entrances and passageways and maneuvering in small areas. Erected and ready for use it is sized and shaped to provide optimum utility in the space available in commercial airplanes. Collapsed it is sized and shaped to conform to commercial airline regulations relating to carry-on baggage.

While the collapsible wheeled seat of the present invention has been described in connection with the preferred embodiment, it is not intended to limit the invention to the particular form set forth, but on the contrary, it is intended to cover such alternatives, modifications, and equivalents as may be included within the spirit and scope of the invention as defined by the appended claims.

We claim:

1. An erectable, collapsible seat, comprising:
   a front end;
   a back end connected to said front end by a first foldable side and a second foldable side, each of said sides comprising a first side member pivotally connected to said front end and a second side member pivotally connected to said back end, said first and second side members on said first side being pivotally connected to define a first axis and said first and second side members on said second side being pivotally connected to define a second axis, whereby said first axis and said second axis translate toward each other when said seat is being collapsed;
   a top supported by said front and back ends when said seat is in an erected condition;
   a back support connected to said back end when said seat is in said erected condition;
   a plurality of wheels connected to said front and back ends;
   means for locking at least one of said wheels so as to prohibit undesired rolling thereof; and
   bracket means pivotally connected to said front end and being connected to said back end for bracing said front and back ends and foldable sides when said seat is in said erected condition.

2. An erectable, collapsible seat, as recited in claim 1, wherein said means for locking said at least one of said wheels comprises a lever and cam assembly connected to said back end and being operatively engaged with a plunger assembly for impinging against at least one of said wheels.

3. An erectable, collapsible seat, comprising:
   a front end;
   a back end connected to said front end by a pair of foldable sides;
   a top supported by said front and back ends when said seat is in an erected condition;
   a back support connected to said back end when said seat is in said erected condition;
   a plurality of wheels connected to said front and back ends;
   means for locking said at least one of said wheels so as to prohibit undesired rolling thereof; and
   bracket means pivotally connected to said front end and being connected to said back end for bracing said front and back ends and foldable sides when said seat is in said erected condition, wherein said bracket means comprises a generally U-shaped bracket pivotally connected to said front end and being received within a clip connected to said back end when said seat is in said erected condition.

4. An erectable, collapsible seat, comprising:
a first end;
a second end connected to said first end by a first foldable side and a second foldable side, each of said sides comprising a first side member pivotally connected to said first end and a second side member pivotally connected to said second end, said first and second side members on said first side being pivotally connected to define a first axis and said first and second side members on said second side being pivotally connected to define a second axis, whereby said first axis and said second axis translate each other when said seat is being collapsed;
a top supported by said first and second ends when said seat is in an erected condition;
at least one wheel connected to said first end and at least one wheel connected to said second end;
means for releasably locking at least one of said wheels; and
brace means pivotally connected to said first end and being releasably connected to said second end when said seat is in said erected condition.

5. An erectable, collapsible seat, comprising:
a first end;
a second end connected to said first end by a first foldable side and a second foldable side, each of said sides comprising a first side member pivotally connected to said first end and a second side member pivotally connected to said second end, said first and second side members on said first side being pivotally connected to define a first axis and said first and second side members on said second side being pivotally connected to define a second axis, whereby said first axis and said second axis translate toward each other when said seat is being collapsed;
a top supported by said first and second ends when said seat is in an erected condition;
at least one wheel connected to said first end and at least one wheel connected to said second end; and
means for releasably locking at least one of said wheels.

6. An erectable, collapsible seat, comprising:
a first end;
a second end connected to said first end by a first foldable side and a second foldable side, each of said sides comprising a first side member pivotally connected to said first end and a second side member pivotally connected to said second end, said first and second side members on said first side being pivotally connected to define a first axis and said first and second side members on said second side being pivotally connected to define a second axis, whereby said first axis and said second axis translate toward each other when said seat is being collapsed;
a top supported by said first and second ends when said seat is in an erected condition;
at least one wheel connected to said first end and at least one wheel connected to said second end; and
brace means pivotally connected to said first end and being releasably connected to said second end when said seat is in said erected condition.

7. An erectable, collapsible seat, comprising:
a pair of support members;
a first foldable side and a second foldable side, each of said sides comprising a first side member pivotally connected to one of said support members and a second side member pivotally connected to said other one of said support members, said first and second side members on said first side being pivotally connected to define a first axis and said first and second side members on said second side being pivotally connected to define a second axis, whereby said first axis and said second axis translate toward each other when said seat is being collapsed;
at least one wheel connected to one of said support members and at least one wheel connected to said other one of said support members; and
means for releasably locking at least one of said wheels.

8. An erectable, collapsible seat, comprising:
a pair of support members;
a first foldable side and a second foldable side, each of said sides comprising a first side member pivotally connected to one of said support members and a second side member pivotally connected to said other one of said support members, said first and second side members on said first side being pivotally connected to define a first axis and said first and second side members on said second side being pivotally connected to define a second axis, whereby said first axis and said second axis translate toward each other when said seat is being collapsed;
at least one wheel connected to one of said support members and at least one wheel connected to said other one of said support members; and
brace means pivotally connected to one of said support members and being releasably connected to said other one of said support members when said seat is in said erected condition.

9. An erectable, collapsible seat, comprising:
a first end;
a second end connected to said first end by a pair of foldable sides, each of said sides being pivotal in approximately the center thereof to thereby fold inward toward each other when said seat is being collapsed;
a top supported by said first and second ends when said seat is in an erected condition;
at least one wheel connected to said first end and at least one wheel connected to said second end;
means for releasably locking at least one of said wheels; and
brace means pivotally connected to said first end and being releasably connected to said second end when said seat is in said erected condition, wherein said brace means comprises a generally U-shaped member.

10. An erectable, collapsible seat, comprising:
a first end;
a second end connected to said first end by a pair of foldable sides, each of said sides being pivotal in approximately the center thereof to thereby fold inward toward each other when said seat is being collapsed;
a top supported by said first and second ends when said seat is in an erected condition;
at least one wheel connected to said first end and at least one wheel connected to said second end; and
brace means pivotally connected to said first end and being releasably connected to said second end when said seat is in said erected condition, wherein said brace means comprises a generally U-shaped member.

11. An erectable, collapsible seat, comprising:
a pair of support members;
a pair of foldable sides, each of which are connected to said support members, each of said sides comprising pivot means in approximately the center thereof for folding said sides inward toward each other when said seat is being collapsed;
at least one wheel connected to one of said support members and at least one wheel connected to said other one of said support members; and
brace means pivotally connected to one of said support members and being releasably connected to said other one of said support members when said seat is in said erected condition, wherein said brace means comprises a generally U-shaped member.

12. An erectable, collapsible seat, as recited in claim 5, wherein said first and second side members on each of said sides comprise a pair of hingedly connected panels.

13. An erectable, collapsible seat, as recited in claim 6, wherein said first and second side members on each of said sides comprise a pair of hingedly connected panels.

14. An erectable, collapsible seat, as recited in claim 7, wherein said first and second side members on each of said sides comprise a pair of hingedly connected panels.

15. An erectable, collapsible seat, as recited in claim 8, wherein said first and second side members on each of said sides comprise a pair of hingedly connected panels.

16. A method for erecting a collapsed seat, comprising the steps of:
unfolding a pair of sides, each of said sides being connected to a front end and a back end of said seat, each of said sides comprising a first side member pivotally connected to said front end and a second side member pivotally connected to said back end, said first and second side members on said first side being pivotally connected to define a first axis and said first and second side members on said second side being pivotally connected to define a second axis, whereby said first axis and said second axis translate away from each other when said seat is being erected;
releasably holding each of said sides in said unfolded condition; placing a top of said seat so as to be supported by said front end and said back end; and releasably locking at least one wheel of said seat.

17. A method for erecting a collapsed seat, as recited in claim 16, wherein said step of releasably holding each of said sides in said unfolded condition comprises the step of pivoting a brace member connected to one of said ends and releasably engaging said brace member with said other one of said ends.

18. A method for erecting a collapsed seat, comprising the steps of:
unfolding a pair of sides, each of said sides being connected to a front end and a back end of said seat, each of said sides comprising a first side member pivotally connected to said front end and a second side member pivotally connected to said back end, said first and second side members on said first side being pivotally connected to define a first axis and said first and second side members on said second side being pivotally connected to define a second axis, whereby said first axis and said second axis translate away from each other when said seat is being erected;
releasably holding each of said sides in said unfolding condition; placing a top of said seat so as to be supported by said front end and said back end; and releasably locking at least one wheel of said seat.

19. A method for erecting a collapsed seat, comprising the steps of:
unfolding a pair of sides, each of said sides being hingedly connected to a front end and a back end of said seat, said sides being foldable such that when said seat is being erected, each of said sides pivot about a generally upright axis in approximately the center of each of said sides and said front end and said back end move away from each other;
releasably holding each of said sides in said unfolded condition,
wherein said step of releasably holding each of said sides in said unfolded condition comprises the step of pivoting a brace member connected to one of said ends and releasably engaging said brace member with said other one of said ends;
placing a top of said seat so as to be supported by said front end and said back end; and releasably locking at least one wheel of said seat.

20. A method for collapsing an erected seat, comprising the steps of:
pivoting a brace member connected to a first end of said seat so as to disengage an end of said brace member from a second end of said seat;
folding a pair of sides, each of said sides being connected to said first end and said second end of said seat, each of said sides comprising a first side member pivotally connected to said first end and a second side member pivotally connected to said second end, said first and second side members on said first side being pivotally connected to define a first axis and said first and second side members on said second side being pivotally connected to define a second axis, whereby said first axis and said second axis translate toward each other when said seat is being collapsed; and
releasably holding said first end and said second end in close proximity.

* * * * *